United States Patent [19]

Narusawa

[11] Patent Number: 4,823,203

[45] Date of Patent: Apr. 18, 1989

[54] ROTATION SPEED DETECTION CIRCUIT IN A VIDEO DISC PLAYBACK DEVICE FOR DETECTING A STATE IN WHICH THE ROTATION SPEED IS DOUBLE A NORMAL SPEED

[75] Inventor: Sadayuki Narusawa, Hamamatsu, Japan

[73] Assignee: Nippon Gakki Seizo Kabushiki Kaisha, Japan

[21] Appl. No.: 913,483

[22] Filed: Sep. 29, 1986

[30] Foreign Application Priority Data

Oct. 7, 1985 [JP] Japan .................................. 60-221782

[51] Int. Cl.$^4$ .............................................. G11B 7/00
[52] U.S. Cl. ...................................... 358/342; 369/53; 369/58; 369/133; 369/240; 360/73.03
[58] Field of Search ................... 358/342; 369/53–58, 369/133, 240, 32, 33; 360/73

[56] References Cited

U.S. PATENT DOCUMENTS 4,416,002 11/1983 Oguino et al. .................. 358/342 X
4,707,818 11/1987 Suzuki et al. .................. 358/342 X Primary Examiner—Robert L. Richardson
Attorney, Agent, or Firm—Spensley Horn Jubas & Lubitz

[57] ABSTRACT

A circuit in a video disc playback device for detecting a state in which a disc motor rotation speed is double a normal rotation speed comprises a counter for counting a signal occurring at a timing intermediate between windows established for a timing at which a horizontal synchronizing signal is expected to occur and a double speed judgement circuit receiving a count by this counter and produces a double speed detection signal when the count has reached a predetermined value within a certain fixed period. The double speed detection signal is utilized for preventing an erroneous switching between AFC and PLL in the disc motor control such as an erroneous switching from AFC mode to PLL mode with phase locking in a double rotation speed.

4 Claims, 7 Drawing Sheets

| MODE MD | LMT COUNTER 72 | WINDOW WS | WINOW WD | TBC |
|---|---|---|---|---|
| 0 (AFC) | 1 (N1) | WS1 (±30%) | WD1 (±30%) | OFF |
| 1 (PLL1) | 1 (N1) | WS1 (±30%) | WD1 (±30%) | OFF |
| | 2 (N2) | WS2 (±1.5%) | | |
| 2 (PLL2) | 2 (N2) | WS3 $\left(^{+4.8\%}_{-1.5\%}\right)$ | WD2 $\left(^{+4.8\%}_{-1.5\%}\right)$ | ON |

FIG. 7

| SWITCHING OF MARGINAL VALUE |||
|---|---|---|
| MARGINAL VALUE BEFORE SWITCHING | CONDITION | MARGINAL VALUE AFTER SWITCHING |
| N1 (LMT COUNTER 72 = 1) | REACH FROM $N \leq N_1$ TO $N = N_1$ | N2 (2) |
| N2 (2) | REACH FROM $N > N_1$ TO $N = N_1$ | N1 (1) |

FIG. 8

| SWITCHING OF MODE MD |||
|---|---|---|
| MODE MD BEFORE SWITCHING | CONDITION | MODE MD AFTER SWITCHING |
| 0 (AFC) | REACH N=N1 | 1 (PLL1) |
| 1 (PLL1) | REACH N=N2 | 2 (PLL2) |
| 2 (PLL2) | REACH N=N1 | 1 (PLL1) |
| 1 (PLL1) | REACH N=0 | 0 (AFC) |

FIG. 9

ROTATION SPEED DETECTION CIRCUIT IN A VIDEO DISC PLAYBACK DEVICE FOR DETECTING A STATE IN WHICH THE ROTATION SPEED IS DOUBLE A NORMAL SPEED

BACKGROUND OF THE INVENTION

This invention relates to a circuit for detecting a state in which the disc rotation speed in a video disc playback device is double a normal speed (hereinafter called "double speed").

The control of rotation of a disc motor in a video disc playback device is generally made by switching between an AFC (auto frequency control) and a PLL (phase locked loop). The AFC is a relatively rough control according to which rotation of a disc motor is controlled by comparing, in frequency, a pulse generated from a frequency generator with a period corresponding to the rotation speed of the disc motor, with a reference pulse produced from a crystal oscillator output. The PLL is a relatively accurate control according to which rotation of the disc motor is controlled by comparing, in phase, a horizontal synchronizing signal picked up from a signal reproduced from the disc with a reference clock produced from a crystal oscillator output.

In starting the disc motor, rotation is started with the AFC and, when a state in which a signal is reproduced from the disc and the PLL can be implemented by comparing the horizontal synchronizing signal with the reference clock in phase has been brought about, the control is switched from the AFC to the PLL.

A target rotation speed according to the AFC is set at the same speed as a rotation speed at the innermost circumference both of a CLV disc and a CAV disc (1800 rpm). In the case of the CLV disc, therefore, the rotation speed at the innermost circumference becomes more than double a rotation speed at an outer circumference (600 rpm at the outermost circumference). If, accordingly, the PLL is unlocked at the outer circumference and the mode is switched to the AFC, there is possibility that the rotation speed will reach double a proper rotation speed.

Detection of a horizontal synchronizing signal in the PLL is effected, as shown in FIG. 2, by detecting falling of a synchronizing component signal obtained from a signal reproduced from a disc. For removing noise and equalizing pulses occurring in a vertical interval and obtaining a normal horizontal synchronizing signal only, a so-called window is established in a time section in which the horizontal synchronizing signal is expected to occur.

In a double speed state, therefore, the horizontal synchronizing signal which occurs with a ½ period of a normal period is removed alternately by the window so that the window output is not different from that during a normal rotation. Accordingly, an erroneous switching to the PLL and locking at the PLL will take place despite the double speed state unless there is some means for detecting existence of the double speed state.

It is, therefore, an object of the invention to provide a double speed detection circuit in a video disc playback device capable of accurately detecting a double speed state in the disc rotation.

SUMMARY OF THE INVENTION

For achieving this object, it is a feature of the double speed detection circuit according to the invention to count a signal appearing at a timing intermediate between windows which are established for detecting a horizontal synchronizing signal and detect a double speed state by finding that the count has reached a predetermined value within a certain period of time.

The double speed detection circuit according to the invention is characterized in that it comprises a horizontal signal takeout circuit for taking out a synchronizing signal from a signal reproduced from a disc, a window circuit for establishing a window for an expected timing of a next synchronizing signal on the basis of the synchronizing signal taken out of the reproduced signal, a counter for counting a signal occurring at a timing intermediate between windows established by said window circuit and a double speed judgment circuit receiving a result of counting by said counter and producing a double speed detection signal when the result of counting has reached a predetermined count within a predetermined period of time.

Since there are only equalizing pulses, which occur during a vertical interval, between horizontal synchronizing signals in one field of a television signal, no signal but these equalizing pulses can be detected at a timing intermediate between windows for detecting the horizontal synchronizing signal during a normal rotation but, in a double speed state, the horizontal synchronizing signal also occurs at this intermediate timing because the period of the horizontal synchronizing signal becomes half the normal period. Consequently, by counting signals occurring at the intermediate timing, the double speed state can be detected when the count has reached a certain predetermined value.

A preferred embodiment of the invention will now be described with reference to the accompanying drawings.

BRIEF DESCRIPTION OF THE DRAWINGS

In the accompanying drawings,

FIG. 7 is a diagram showing states in respective modes set by a mode control circuit 70;

FIG. 8 is a diagram showing switching conditions of an LMT counter 72 of FIG. 1;

FIG. 9 is a diagram showing switching conditions of a mode MD of FIG. 1;

DESCRIPTION OF A PREFERRED EMBODIMENT

Figure 1:
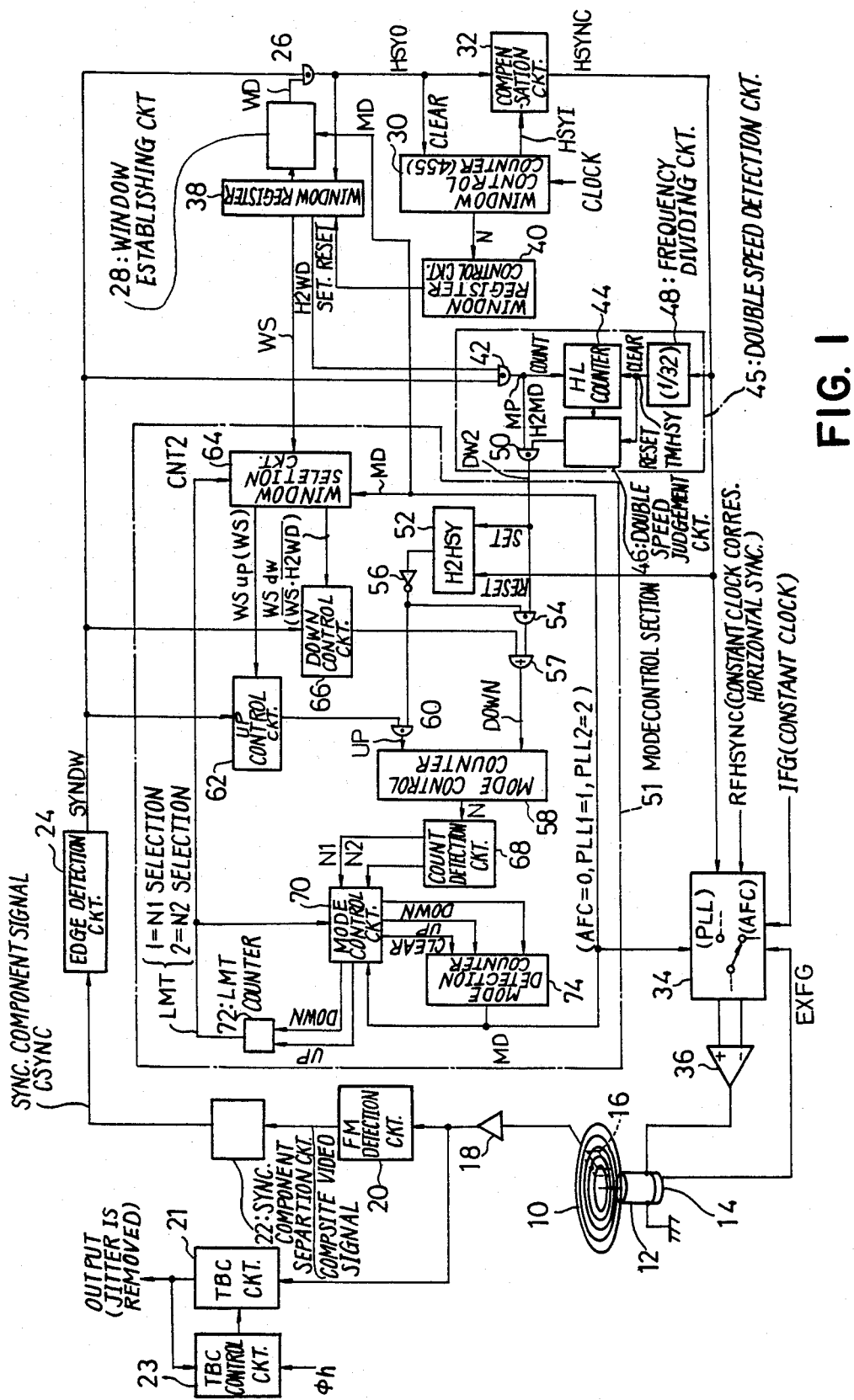
FIG. 1 is a block diagram showing an embodiment of the double speed detection circuit according to the invention.
Figure 2:
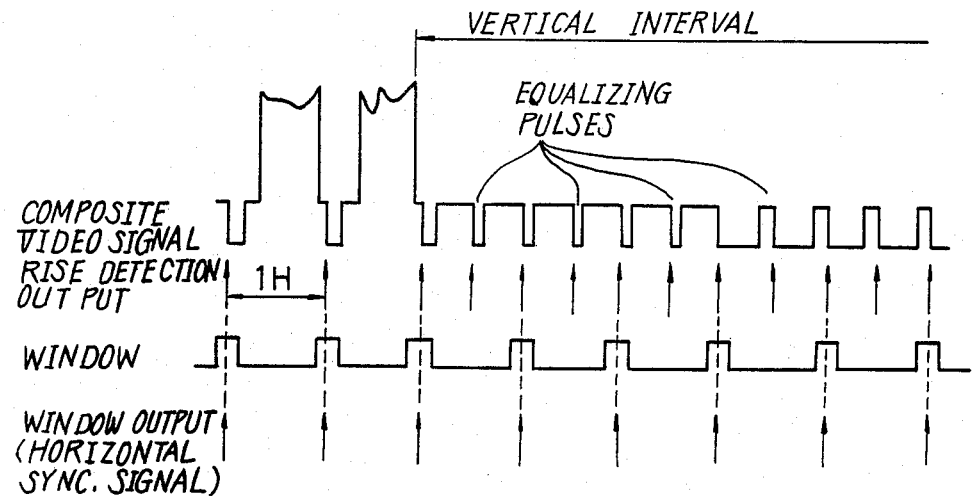
FIG. 2 is a time chart showing a process of detecting a horizontal synchronizing signal.
Figure 3:
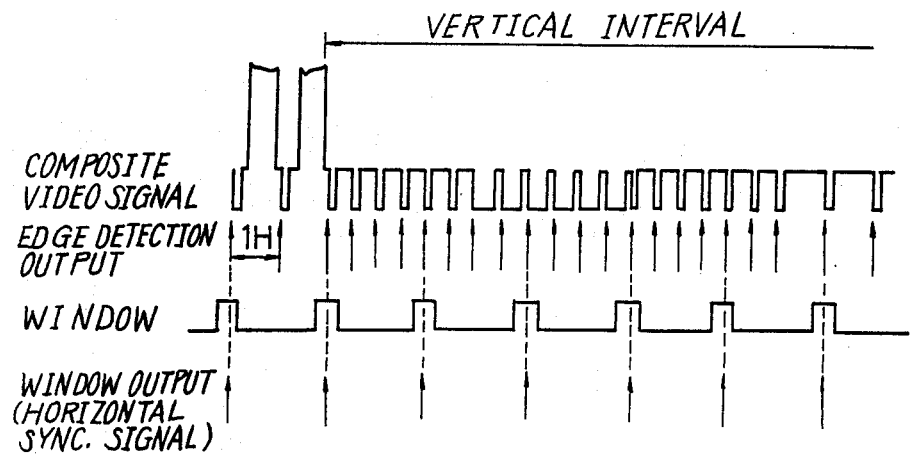
FIG. 3 is a time chart showing a process of detecting the horizontal synchronizing signal during double speed.

FIG. 1 shows an embodiment of the invention. Description will be made about a case in which the invention is applied to a playback device for a video disc.

In FIG. 1, a video disc 10 is rotated by a disc motor 12. A frequency generator 14 which is coupled to the disc motor 12 produces a pulse with a period proportionate to the rotation speed of the disc motor 12.

Data recorded on the disc 10 which has been detected by a pickup head 16 consists of a pulse frequency-modulated signal. This signal is applied to an FM detection circuit 20 for FM detection through an HF amplifier 18 and a composite video signal is provided from the FM detection circuit 20.

The output of the HF amplifier 18 is also applied to a TBC (time base correct) circuit 21. The TBC circuit 21 is provided for removing a jitter (sway on the time axis) contained in the reproduced signal from the disc and consists of a continuously variable delay circuit (e.g., the delay circuit utilizing CMOS inverters disclosed in the U.S. patent application No. 760,332. A TBC control circuit 23 continuously variably controls the delay time of the TBC circuit 21. By comparing, in phase, a horizontal synchronizing signal existing in the output of the TBC circuit 21 with a clock $\phi$ h generated with a period of a regular horizontal synchronizing signal produced in response to crystal oscillator outputs and controlling the delay time of the TBC circuit 21 in accordance with the phase difference, a signal which has been removed of jitter is produced by the TBC circuit 21.

The composite video signal provided from the FM detection circuit 20 is supplied to a synchronizing component separation circuit 22 in which a synchronizing component signal CSYNC is separated.

An edge detection circuit 24 detects a fall portion of the synchronizing component signal CSYNC excluding a fall portion which is apparently deemed to be one of noise and thereupon produces an assumed synchronizing signal (i.e., a signal which is expected to be a true synchronizing signal) SYNDW. The removal of noise in this stage is performed by detecting only a fall portion which has a succeeding low level portion of a sufficient pulse width as required for the synchronizing signal and has a preceding pulse portion which maintains a risen state for a predetermined period of time.

The assumed synchronizing signal SYNDW obtained in this manner contains not only a horizontal synchronizing signal but also an equalizing pulse which is interposed between timings of the horizontal synchronizing signals during vertical retrace cancelling periods for discriminating a vertical synchronizing signal. There is also a possibility that an unexpected noise remains in the assumed synchronizing signal.

For removing such equalizing pulse and unexpected noise, a window establishing circuit 28 is provided. This window establishing circuit 28 establishes a window WD at a timing at which a horizontal synchronizing signal HSYO is expected to occur and takes out, from an AND gate 26, the assumed synchronizing signal SYNDW occurring in the window WD as a true horizontal synchronizing signal HSYO. By this arrangement, equalizing pulses and noise which occur outside of the window are removed.

The width of the window WD is changed over among various widths as will be described later depending upon the state of stableness of the disc rotation.

A window control counter 30 measures timing within one horizontal scanning period H (i.e., a normal interval of generation of the horizontal synchronizing period HSYO). The window control counter 30 counting up a crystal oscillator output counts 455 counts in one horizontal scanning period H during the normal rotation speed and is cleared by the horizontal synchronizing signal HSYO.

A compensation circuit 32 produces, when the horizontal synchronizing signal HSYO has not been obtained in the window WD due to dropout or the like cause, a substitution signal HSYI at the 454-th count of the window control counter 30. When the substitution signal HSYI is utilized, the window control counter 30 is cleared by this substitution signal HSYI.

Since the window WD has some ranges before and after the 454-th count of the window control counter 30, whether the horizontal synchronizing signal HSYO occurs in the window WD or not is not known at the timing of the 454-th count (the signal HSYO may occur in the window range after the 454-th count). In the compensation circuit 32, therefore, the horizontal synchronizing signal HSYO and the substitution signal HSYI are delayed for a predetermined time and, upon ending of the window WD, either the horizontal synchronizing signal HSYO (when the horizontal synchronizing signal has occurred in the window) or the substitution signal HSYI (when the horizontal synchronizing signal has not occurred in the window) is provided from the compensation circuit 32.

A switching circuit 34 switches the disc rotation control mode between PLL based upon phase comparison of the horizontal synchronizing signal HSYO with a reference clock RFHSYNC and AFC based upon frequency comparison of an output pulse EXFG of the frequency generator 14 with a reference clock IFG. A comparator 36 carries out this phase comparison or frequency comparison for controlling the rotation of the disc motor 12.

A window register control circuit 40 produces signals designating timings of starting and ending of windows in response to counts of the window control counter 30. In this embodiment, the control circuit 40 produces signals designating timings of the above described window WD for detecting the horizontal synchronizing signal HSYO and, in addition to it, timings of an intermediate window H2WD for detecting a double and windows WS for detecting states of stableness the disc rotation.

Figure 4:
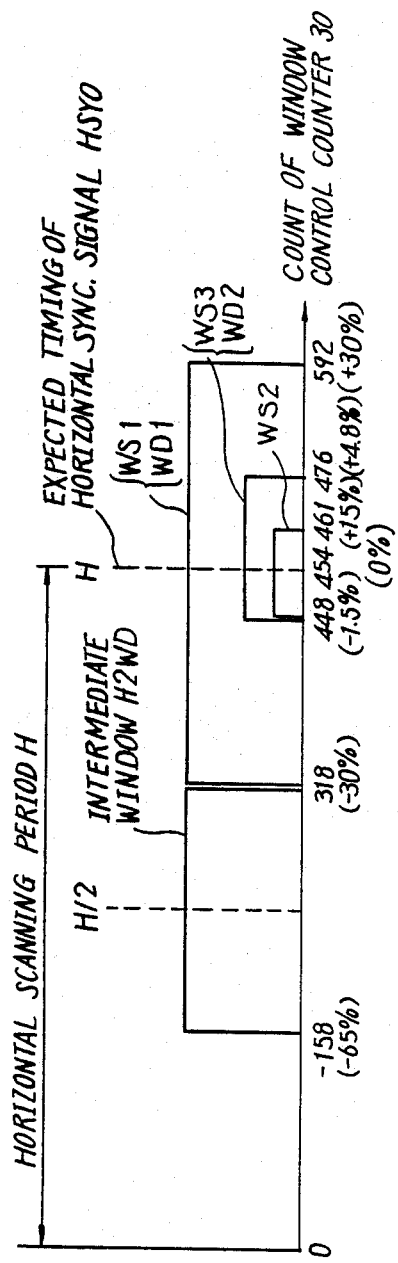
FIG. 4 is a diagram showing timings of windows used in the embodiment of FIG. 1.

An example of the respective windows is shown in FIG. 4. The window WD for detecting the horizontal synchronizing signal HSYO consists of a wide window WD1 and a window WD2. The wide window WD1 is established for a period of time from count 318 to count 592 of the window control counter 30 ($\pm 30\%$ from the timing at which the horizontal synchronizing signal HSYO is expected to occur, the period of 1H being taken as 100%). The narrow window WD2 is established for a period of time from count 448 to 476 ($-1.5\%$ to $+4.8\%$).

The intermediate window H2WD for detecting the double speed is established for a period of time from count 158 to count 318 ($-65\%$ to $-30\%$), i.e., a predetermined period starting and ending at a timing about the middle of one horizontal scanning period 1H. This timing coincides with the timing of the equalizing pulse.

The windows WS for detecting the stableness of the disc rotation consist of WS1, WS3 and WS2, in the order of a wider window range. The window WS1 is established for a period of time from count 318 to count 592 (±30% from the expected timing of the horizontal synchronizing signal HSYO). The window WS3 is established for a period of time from count 448 to count 476 (−1.5% to +4.8% ). The window WS2 is established for a period of time from count 448 to count 461 (±1.5% ).

A window register 38 comprises registers for the respective windows which are set and reset at corresponding timings by signals from the window register control circuit 40 thereby producing signals indicating the window range of the respective windows A double speed detection circuit 45 is provided for detecting a double speed state of disc rotation. In the double speed detection circuit 45, an AND gate 42 gates out, from among the assumed synchronizing signals SYNDW, a signal (hereinafter referred to as intermediate pulse MP) occurring in the intermediate window H2WD established at a timing about the middle of the horizontal scanning period.

An HL counter 44 counts the intermediate pulse MP gated out of the AND gate 42. The HL counter 44 is reset (every 32H) by a signal TMHSY derived by frequency-dividing the horizontal synchronizing signal HSYNC by 32 by a frequency dividing circuit 48.

Figure 5:
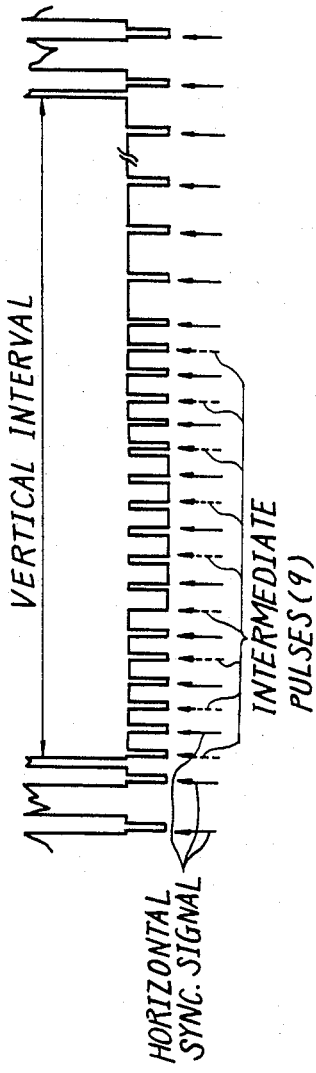
FIG. 5 is a diagram showing intermediate pulses appearing during a vertical interval.

A double speed judgment circuit 46 detects a double speed state of the disc rotation on the basis of a count of the HL counter 44. Pulses appearing at a timing intermediate the horizontal synchronizing signal in one field of a television signal are, as shown by dotted arrows in FIG. 5, nine equalizing pulses occurring in the vertical interval. If the disc is rotating at a normal speed, the count of the HL counter 44 within the period of 32H until the HL counter 44 is reset (about ⅓ of one field) is 9 counts due to the equalizing pulses at the maximum and, accordingly, the double speed judgment circuit 46 produces double speed detection signal H2MD when its count has reached 10.

The double speed detection signal H2MD enables an AND gate 50 and causes it to gate out the intermediate pulse MP.

There is likelihood that the count of the HL counter 44 reaches 10 due to addition of noise to the equalizing pulses notwithstanding that the disc-rotation is not in the double speed state. For this reason, the double speed judgment circuit 46 does not make the judgment of the double speed state in the 32H period in which the count of the HL counter 44 has reached 10 but produces the double speed detection signal H2MD in a next 32H period. This arrangement is advantageous also in that erroneous outputting of the equalizing pulse from the double speed detection circuit 45 can be prevented because the 32H period in which the double speed detection signal H2MD is produced comes after occurring of the equalizing pulse.

Figure 6:
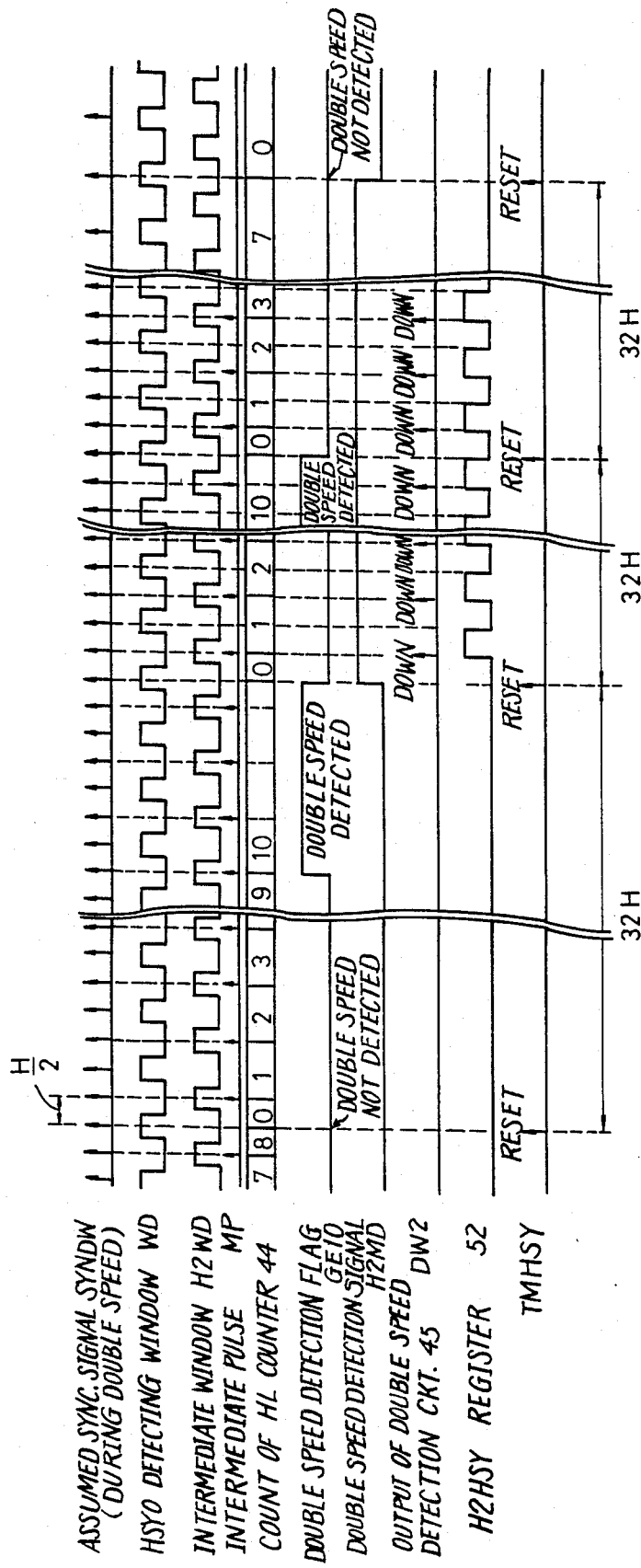
FIG. 6 is a time chart showing an operation of a double speed judgment circuit 45.

FIG. 6 shows a double speed detection operation by the double speed detection circuit 45.

In the double speed state, the edge detection circuit 24 produces the assumed synchronizing signal SYNDW each ½H.

The intermediate window H2WD normally is established at a timing intermediate the window WD for picking up the horizontal synchronizing signal HSYO but, in the double speed state, the assumed synchronizing signal SYNDW appears also at the timing of the intermediate window H2WD and this signal is gated out of the AND gate 42 and applied to the HL counter 44 as the intermediate pulse MP to be counted up by the HL counter 44.

When the count of the HL counter 44 has reached 10 before the counter 44 is reset by the signal TMHSY, a double speed detection flag GE10 rises in the double speed judgment circuit 46. In response to this flag GE10, the double speed detection signal H2MD is produced in a next 32H period. If the double speed slate has been detected also during this next 32H period, the double speed detection signal H2MD continues to be produced in a further next 32H period. While the double speed detection signal H2MD is produced, the intermediate pulse MP is provided as a pulse DW2 through the AND gate 50.

When the double speed state has ceased to exist, the HL counter 44 is reset before its count reaches 10 so that the double speed detection flag GE10 does not rise any longer and the double speed detection signal H2MD is not produced. This disables the AND gate 50 so that the signal DW2 is not provided by the AND gate 50 even if the intermediate pulse MP due to noise, etc. is applied to the AND gate 50.

The output pulse DW2 from the double speed detection circuit 45 is applied to a mode control section 51. The mode control section 51 detects the state of stableness of the disc rotation and switches the control mode depending upon the detected state of stableness. In the disc motor rotation control for a video disc playback device, as described above, the control mode is switched between AFC and PLL in such a manner that after starting with AFC the control is switched to PLL upon reaching a state in which PLL is possible. The PLL however is implemented within a certain range of the rotation speed above and below a target rotation speed and, accordingly, switching to the PLL does not necessarily bring about a stable rotation of the disc motor at the target speed immediately. Besides, even after a stable rotation at the target speed has been attained by the PLL, the PLL sometimes is unlocked for some reason such as a shock applied to the disc from outside and a scratch on the disc and the disc rotation thereby becomes unstable. If, accordingly, controls which should be carried out in stable rotation state of the disc such as a jitter removal control by the above described TBC circuit 21 and a control for switching a window for detecting the horizontal synchronizing signal HSYO by the window establishing circuit 28 are carried out on the assumption that the stable rotation state has been brought about merely because the control mode has been switched to the PLL, accurate implementation of these controls cannot be expected.

For these reasons, the control mode in the mode control section 51 is switched between AFC mode, PLL1 mode and PLL2 mode depending upon the stableness of disc rotation. The AFC mode is used in the most unstable state and the disc rotation control is effected by AFC during this mode. The PLL1 mode is used in state which is more stable than the AFC mode but has not reached a final stable state yet and the disc rotation control is effected by PLL during this mode. The PLL2 mode is used in the final stable state and the disc rotation control is effected by PLL also during this mode. It is not until this PLL2 mode that controls such as the jitter removal control and the window switching control by the window establishing circuit 28 are carried out. An arrangement is made so that while strict conditions are imposed in switching the mode to a higher mode, i.e., from the AFC mode to the PLL1 mode or from the PLL1 mode to the PLL2 mode, the mode is not switched readily to a lower mode once it has entered a higher mode thereby preventing too frequent switching of the control mode.

The detection of the stable state of the disc rotation is made by employing the disc rotation state detection windows WS established by the window register 38 etc. and detecting the assumed synchronizing signal SYNDW has occurred at a timing at which the horizontal synchronizing signal HSYO is expected to occur. If the number of times the assumed synchronizing signal SYNDW occurs in the window WS is large, the disc rotation is assumed to be in a stable state and otherwise it is assumed to be in an unstable state. When the disc motor 12 is driven by AFC, occurrence of the assumed synchronizing signal SYNDW is watched in the wide window WS1 ( with the ranges of ±30% from the expected timing of the horizontal synchronizing signal HSYO ) and, when the number of times this signal SYNDW occurs in the window WS1 has exceeded a predetermined number, the control mode is switched to the PLL1 mode. In the PLL1 mode, occurrence of the assumed synchronizing signal SYNDW is watched in the narrow window WS2 (with the ranges of ±1.5% ) and, when the number of times the signal SYNDW occurs in the window WS2 has exceeded a predetermined number, the control mode is switched to the PLL2 mode on the assumption that the most stable state has been reached.

Since it has now been confirmed by entering of the PLL2 mode that the disc rotation has reached the most stable state, the controls including the jitter removal control by the TBC circuit 21 and the window switching control (i.e., switching from the wide window WD1 to the narrow window WD2) for detecting the horizontal synchronizing signal HSYO are carried out. By this switching of the window WD, noise in the assumed synchronizing signal SYNDW is substantially removed and a normal horizontal synchronizing signal HSYO only is picked up.

Even after the control mode has been switched to the PLL2 mode, the disc rotation sometimes becomes unstable due to some reason. To cope with this situation, occurrence of the horizontal synchronizing signals HSYO is watched in the window WS3 and, when the number of times the signal HSYO has not occurred in this window WS3 has increased above a predetermined number, the control mode is switched to the PLL1 mode. For preventing too frequent switching of the control mode in such cases, the window range of the window WS3 is set to be one from $-1.5\%$ to $+4.8\%$ which is wider than the range of the window WS2 ( ±1.5% ) used in the PLL1 mode.

In the case where the double speed state has been detected, this state is an unstable state so that the control is made so as to switch it to a lowermode or so as not to switch it to a higher one.

The structure of the mode control section 51 will now be described. A window selection circuit 64 selects the window WS for detecting stableness of the disc rotation. More specifically, the window selection circuit 64 selects one of the windows WS1, WS2 and WS3 (FIG. 4) in response to a mode signal MD and a signal LMT from an LMT counter 72 to be described later.

An up control circuit 62 passes one of the assumed synchronizing signals SYNDW which occurs in the window WS which includes the timing of the horizontal synchronizing signal HSYO at a normal speed (this window will sometimes be referred to as window WSUP). A down control circuit 66 passes one of the assumed synchronizing signals SYNDW which occurs outside of the window WS and also outside of the intermediate window H2WD (these windows will hereinafter be referred to as window WSDW). In this case, the assumed synchronizing signal SYNDW occurring in the intermediate wind[w H2WD is excluded for preventing occurrence of a down signal due to an equalizing pulse during the normal rotation of the disc.

Frequency of occurrence of the assumed synchronizing signal SYNDW in the window WSUP increases during a stable rotation whereas frequency of occurrence of the signal SYNDW in the window WSDW increases during an unstable rotation.

When no signal occurs in any of the windows WSUP and WSDW during 1H, the down control circuit 6 judges that this state is an unstable rotation and produces one shot of pulse at each 1H determined by an internal reference counter.

A mode control counter 58 counts up an output pulse from the up control circuit 62 (except during a double speed detection period during which, as will be described later, an AND gate 60 is disabled) and counts down an output pulse from the down control circuit 66. If, accordingly, in the present mode, the rotation becomes stable and frequency of occurrence of the assumed synchronizing signal SYNDW in the window WSUP increases, the count N of the mode control counter 58 increases whereas if the rotation is still unstable and frequency of occurrence of the signal SYNDW in the window WSDW is large, the count N of the mode control counter 58 decreases.

The mode control counter 58 counts up and down from 0 to N2 through N1 (N1 and N2 are marginal counts to be described later which are set at, e.g., N1=2048 and N2=3072). When the mode control counter 58 has counted down to 0, the count N does not go below 0 even when a down pulse is further applied to the counter 58. When the counter 58 has counted up to N2, the count N does not go above N2 even when an up pulse is further applied to the counter 58.

The mode control counter 58 is used for switching the control mode. When it counts up, the disc rotation is deemed to be becoming stable and, upon confirmation of reaching of the count N to a predetermined marginal value, the control mode is switched to a higher one. Conversely, when it counts down, the disc rotation is deemed to be still unstable and, upon confirmation of reaching of the count N to a predetermined marginal value, the control mode is switched to a lower one.

A count detection circuit 68 detects reaching of the count of the mode control counter 58 to the marginal value N1 or N2 which is conditions for switching the control mode.

A mode detection counter 74 designates the control mode. In the mode detection counter 74, the count itself represents the control mode. The mode detection counter 74 counts up and down in response to the outputs of the mode control circuit 70 from 0 to 2 and designates the AFC mode at count 0, the PLL1 mode at count 1 and the PLL2 mode at count 2. The mode signal MD is applied to the switching circuit 34 to switch this circuit 34 to the AFC side when the count is 0 and to the PLL side when the count is 1 or 2.

An LMT counter 72 is a counter indicating which of the marginal values N1 and N2 is to be selected as a target value of the mode control counter 58. When the count N of the mode control counter 58 is smaller than N1, the count of the LMT counter 72 is 1 (i.e., N1 selection) and when the count N is larger than N1, the count of the LMT counter 72 is 2 (N2 selection)

A mode control circuit 70 performs switching of the mode by counting up and down of the mode detection counter 74 and the LMT counter 72 in accordance with the present mode MD, the count of the LMT counter 72 and the count of the mode control counter 58.

States of the respective modes are shown in FIG. 7.

When the mode is the AFC mode (MD=0) and the LMT counter 72 is 1 (N1 selection), the disc rotation detection window WS is ±30%, the window WD for picking up HSYO is controlled at ±30% and the TBC circuit 21 is in an OFF state. This is the initial state.

When the mode is the PLL1 mode (MD=1) and the LMT counter 72 is 1 (N1 selection), the disc rotation detection window WS is ±30%, the window WD for picking up HSYO is controlled at ±30% ant the TBC circuit 21 is in an OFF state.

When the mode is the PLL1 mode (MD=1) and the LMT counter 72 is 2 (N2 selection), the disc rotation detection window WS is ±1.5%, the window for picking up HSYO is controlled at ±30% and the TBC circuit 21 is in an OFF state.

When the mode is the PLL2 mode (MD=2and the LMT counter 72 is 2 (N2 selection), the disc rotation detection window WS is −1.5% to +4.8%, the window WD for picking up HSYO is controlled at −1.5 to +4.8% and the TBC circuit 21 is in an ON state. This is the final stable state.

In a case where a combination of the control mode and the state of the LMT counter 72 which is not described in FIG. 7 has occurred due to an erroneous operation of the circuit (e.g., a combination of the AFC mode and the count 2 of the LMT counter 72 or a combination of the PLL2 mode and the count 1 of the LMT counter 72), the mode control circuit 70 clears the mode detection counter 74 and sets the count of the LMT counter 72 to 1 and thereby restores the mode to the AFC mode which is the initial state.

Conditions of switching of the marginal values N1 and N2 are shown in FIG. 8. The LMT counter 72 which selects the marginal values is switched according to its state before being switched and the value N of the mode control counter 58. When the marginal value before switching is N1 (i.e., the LMT counter 72 is 1), the marginal value is switched to N2 (i.e., the LMT counter 72 is 2) by reaching of the count N to N1. When the marginal value before switching is N2 (i.e., the LMT counter 72 is 2), the marginal value is switched to N1 (i.e., the LMT counter 72 is 1) by reaching of the count N to N1 (i.e., the LMT counter 72 is 1).

Nextly, conditions of switching of the control mode are shown in FIG. 9. The control mode is switched according to the control mode before it is switched and the count of the mode control counter 58. When the control mode before switching is the AFC mode, the control mode is switched to the PLL1 mode by reaching of the count N to the marginal value N1. Once the control mode has been switched to the PLL1 mode, this PLL1 mode is maintained even if the count N has been reduced below N1 unless conditions for the PLL2 mode have been satisfied.

When the control mode before switching is the PLL1 mode, the control mode is switched to the PLL2 mode by reaching of the count N to the marginal value N2. When the control mode before switching is the PLL2 mode, the control mode is switched to the PLL1 mode by reaching of the count N to the marginal value N1. When the control mode before switching is the PLL1 mode, the control mode is switched to the AFC mode by reaching of the count N to 0.

Figure 10:
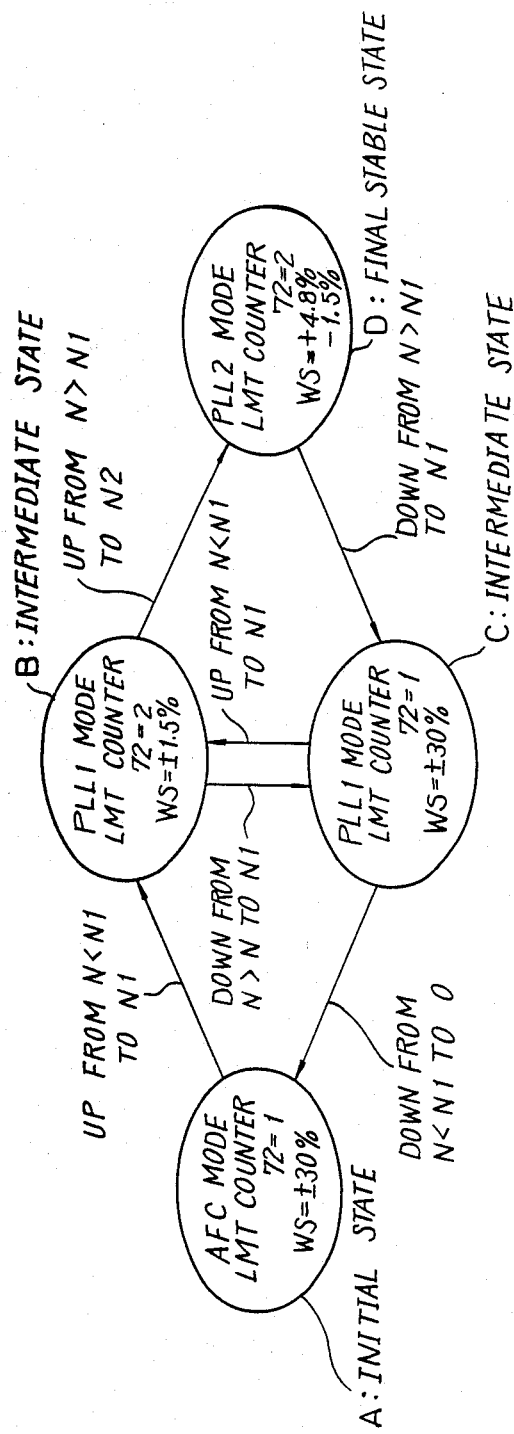
FIG. 10 is a diagram showing change of the mode according to FIGS. 8 and 9.

FIG. 10 shows generally states of change of the control mode by the above described conditions of switching. The illustrated states are results of an operation when a normal playback command has been given. In this operation, the control mode is changed from the initial state A on the left side of the figure towards the final stable state D on the right side in a predetermined order without skipping an intermediate step.

The initial state A is the AFC mode in which the rotation state is detected by using the wide window WS =±30%. Upon reaching of the count N1 in the initial state A, the control mode is changed to the PLL1 mode of an intermediate state B in which the narrow window WS of ±1.5% is used. The count N is temporarily reduced below N1 by switching of the disc rotation control from AFC to PLL and in this case, an intermediate state C is brought about in which, though the control mode is the same PLL1, the rotation state is detected by using the window WS which is widened to ±30%. If the rotation state is directed to a stable state again in the intermediate state C and the count N1 has been reached, the intermediate state B is restored in which the narrow window of ±1.5% is used for detecting the rotation window of ±1.5 state. If the rotation state is directed to a stable state and the count N2 has been reached, the control mode is switched to the PLL2 mode of the final stable state D. In the PLL2 mode, the wider window WS than in the intermediate state B, i.e., −1.5 to +4.8%, is used to prevent too frequent switching of the control mode to the lower mode. Upon reaching of this final stable state D, the window WD for picking up the signal HSYO is switched from one of ±30% to one of −1.5 to +4.8% whereby noise is more certainly removed. The jitter removal operation by the TBC circuit 21 is now started and a stable playback thereby is realized.

Even in a stable rotation state in the PLL2 mode, there sometimes occurs an off-focus state due to a shock applied to the disc or a scratch on the disc and the rotation thereby becomes unstable. Upon decreasing of the count N to N1 in this state, the control mode is switched to the PLL1 mode of the intermediate state C in which restoring to the stable rotation is attempted. If the attempt for restoring to the stable rotation in the intermediate state C has been successful, the control mode is changed through the intermediate state B to the final stable state D. If the attempt for restoring to the stable rotation in the intermediate state C has failed, the control mode is lowered to the AFC mode of the initial state A in which further attempt is made for restoring the stable rotation so that the control mode is changed from the intermediate B (through the intermediate state C to the intermediate state B) to the final stable state D.

Figure 11:
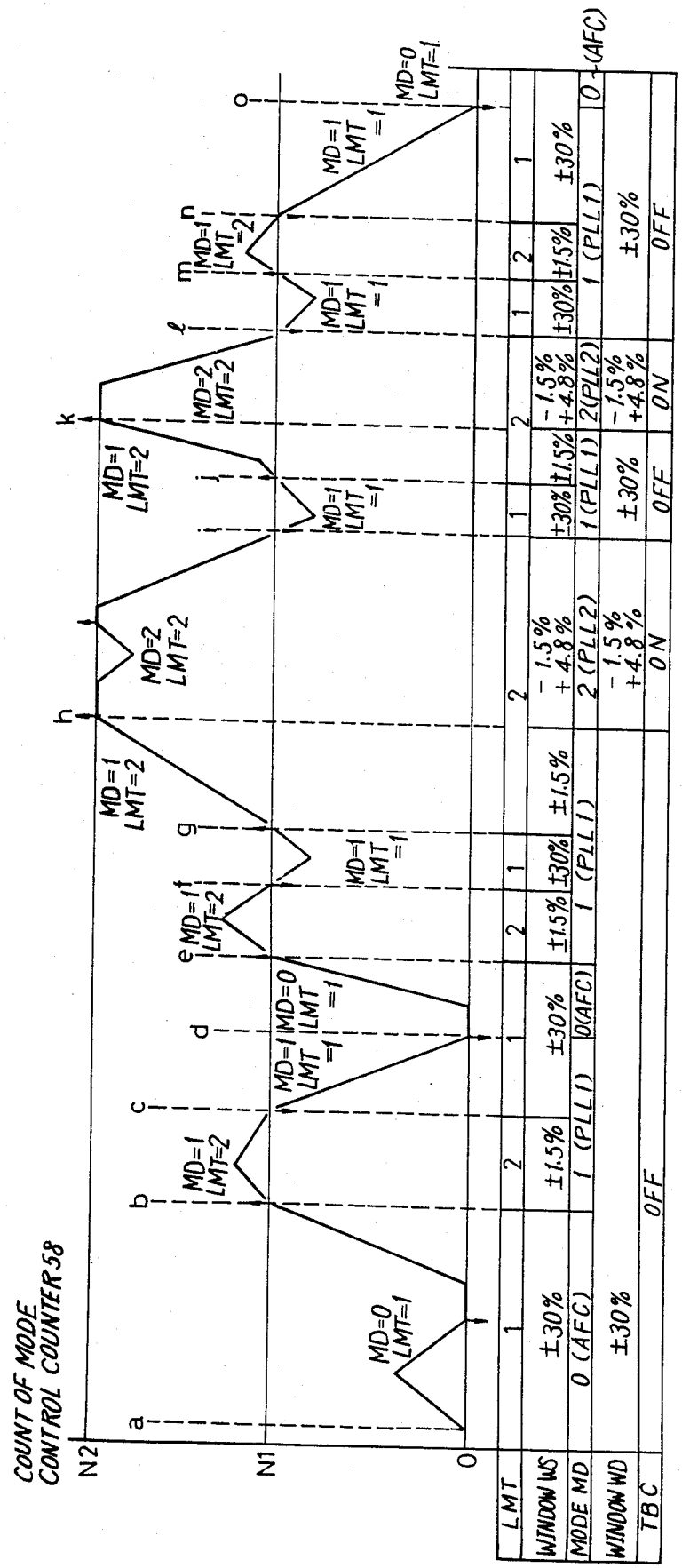
FIG. 11 is a diagram showing an example of actual mode selection based on FIG. 10.

FIG. 11 shows states of actual mode change. Upon starting of the operation at a, the rotation is controlled in the AFC mode until the count N has reached N1. Upon reaching of the count to N1 at b, the control mode is switched to the PLL1 mode (intermediate state B). if the count N is decreased to N1 at c, the control mode is switched to the PLL1 mode (intermediate state C). If the count is further decreased to 0 at d, the control mode is returned to the AFC mode. The count N is not decreased below 0.

If an attempt is made to restore the stable rotation in the AFC mode and the count has reached N1 at e, the control mode is switched to the PLL1 mode (intermediate state B). In switching the rotation control from AFC to PLL, rotation temporarily becomes unstable and the count is decreased to N1 at f and the control mode is switched to the PLL1 mode (intermediate state C). An attempt is made again in this state to restore the stable rotation and, upon reaching of the count N to N1 again at g, the PLL1 mode (intermediate state B) is restored. If the count N further increases to N2 at h, the control mode is switched to the PLL2 mode. The count N does not increase above N2.

If the disc rotation becomes unstable for some reason and the count N is decreased to N1 at i, the control mode is lowered to the PLL1 mode (intermediate state C) and an attempt is made to restore the stable rotation. If the attempt has been successful and the count N has reached N1 at j, the control mode is switched to the PLL1 mode (intermediate state B). If the count N is increased further to N2 at k, the control mode is switched to the PLL2 mode.

If the rotation becomes unstable again and the count N is decreased to N1 at l, the control mode is lowered to the PLL1 mode (intermediate state C) in which an attempt is made to restore the stable rotation. If the count N is increased to N1 at m, the PLL1 mode (intermediate mode B) is brought about. If the unstable rotation continues and the count N is decreased to N1 at n, the control mode is lowered to the PLL1 mode (intermediate state C). If the count N is further decreased to 0 at o, the control mode is switched to the AFC mode and an attempt is made to restore the stable rotation in the initial state again. In the foregoing manner, the switching of the control mode is incessantly made for bringing about the final stable rotation which is the target of the control.

Switching of the mode during the double speed detection is performed in the following manner:

In FIG. 1, the pulse DW2 produced from the double speed detection circuit 45 during the double speed detection is applied to a set input of an H2HSY register 52 in the mode control section 51. The H2HSY register 52 initially is in a reset state and, accordingly, a signal derived by inverting the output of the register 52 by an inverter 56 is "1". Since the H2HSY register 52 is driven by a two-phase clock, it is not immediately set even if the pulse DW2 is applied thereto and an AND gate 54 is in an enabled state. The pulse DW2 therefore is applied to the mode control counter 58 through the AND gate 54 and an OR gate 57 causing this counter 58 to counts down. Upon setting of the H2HSY register 52, the AND gate 54 is switched off. The H2HSY register 52 is reset each 1H by the horizontal synchronizing signal SYNC. Since the intermediate pulse DW2 and the horizontal synchronizing signal HSYNC are alternately produced both with a period of 1H, the H2HSY register 52 is repeatedly set and reset thereby providing a down pulse from the AND gate 54 at each 1H to be down-counted by the mode control counter 58. At this time, the assumed synchronizing signal SYNDW is produced at a period of H/2 but the window WSDW of the down control circuit 66 is outside of the intermediate window H2WD so that the mode control counter 58 does not count down the signal SYNDW but counts down only one at each 1H. At this time, the up control circuit 62 also produces the assumed synchronizing signal SYNDW at a period of 1H. If the H2HSY register 52 is reset at this time, the AND gate 60 is switched on and the mode control counter 58 counts up. Since, however, the horizontal synchronizing signal HSYNC which resets the H2HSY register 52 is provided, as was previously described, after being delayed by the compensation circuit 32 for determining whether it should be replaced by the substitution signal HSYI or not, resetting of the H2HSY register 52 is delayed by this time. Accordingly, the AND gate 60 is in an OFF state at the timing at which a pulse is produced from the up control circuit 62 so that the mode control counter 58 does not count up.

In the foregoing manner, the mode control counter 58 continuously counts down in the double speed state and, in accordance with the above described switching conditions, the mode is switched from the PLL2 mode to the PLL1 mode and further to the AFC mode. Restoration to the normal rotation is carried out in the AFC mode and the final stable state in the PLL2 mode is attained in the normal rotation.

What is claimed is:

1. A rotation speed detection circuit in a video disc playback device comprising:
   a horizontal synchronizing signal separation circuit for separating horizontal synchronizing signals from a signal reproduced from a video disc;
   a window circuit for establishing windows for detecting horizontal synchronizing signals at expected timings of the horizontal synchronizing signals;
   a counter for counting signals occurring in the reproduced signal at a timing intermediate between windows established by said window circuit; and
   a rotation speed judgment circuit receiving a result of counting by said counter and producing a speed detection signal to provide an indication that the rotation speed of the playback device is approximately twice its nominal speed when the result of counting has reached a predetermined count within a predetermined period of time.

2. A rotation speed detection circuit as defined in claim 1 further comprising an intermediate window circuit for establishing an intermediate window intermediate between the windows established by said window circuit, wherein said counter counts the signals occurring within the intermediate window.

3. A rotation speed detection circuit in a video disc playback device comprising:
   means for providing a signal reproduced from a video disc;
   window means for establishing windows for detecting horizontal synchronizing signals from the reproduced signal;
   counting means for counting the number of occurrences of signals in the reproduced signal present at a timing intermediate between consecutive windows; and
   rotation speed judging means for judging that the rotation speed of the playback device is approximately twice its nominal speed when the number of occurrences counted by the counting means has reached a predetermined value within a predetermined period of time period.

4. A speed detection circuit as defined in claim 3 further comprising an intermediate window means for establishing intermediate windows at a timing intermediate between consecutive windows established by the window means so as to detect the signals occurring at the timing intermediate between timings of consecutive windows, wherein the counting means counts the occurrences of the signals detected within the intermediate windows.

* * * * *